United States Patent
Jouppila et al.

(10) Patent No.: US 6,208,633 B1
(45) Date of Patent: Mar. 27, 2001

(54) SYSTEM AND METHOD FOR MOBILE DATA SERVICES

(75) Inventors: Ari Juhani Jouppila, Espou; Raul Arne Söderström, Kyrkslatt, both of (FI); Per Hans Åke Willars, Stockholm (SE)

(73) Assignee: Telefonaktiebolaget LM Ericsson, Stockholm (SE)

( * ) Notice: Subject to any disclaimer, the term of this patent is extended or adjusted under 35 U.S.C. 154(b) by 0 days.

(21) Appl. No.: 09/019,063

(22) Filed: Feb. 5, 1998

(51) Int. Cl.[7] ............................................. H04J 3/16
(52) U.S. Cl. ..................... 370/338; 370/466; 370/468; 370/401
(58) Field of Search ..................... 370/338, 340, 370/341, 401, 465, 466, 468, 395, 396, 398; 455/507, 509, 517, 557, 556, 554, 560

(56) References Cited

U.S. PATENT DOCUMENTS

| | | | |
|---|---|---|---|
| 5,793,762 | * | 8/1998 | Penners et al. ...................... 370/389 |
| 5,873,031 | * | 2/1999 | Griffith et al. ...................... 455/412 |
| 5,896,369 | * | 4/1999 | Warsta et al. ...................... 370/338 |
| 5,905,719 | * | 5/1999 | Arnold et al. ...................... 370/330 |
| 5,956,331 | * | 9/1999 | Rautiola et al. ..................... 370/338 |
| 5,958,018 | * | 9/1999 | Eng et al. ........................... 709/246 |
| 5,970,059 | * | 10/1999 | Ahopelto et al. .................... 370/338 |
| 5,978,386 | * | 11/1999 | Hamalainen et al. ............... 370/466 |
| 6,009,088 | * | 12/1999 | Taguchi et al. ..................... 370/338 |
| 6,016,318 | * | 1/2000 | Tomoike .............................. 370/401 |

FOREIGN PATENT DOCUMENTS

WO 97/25824    7/1997 (WO).

OTHER PUBLICATIONS

Melanchuck et al, CDPD and Emerging Digital Cellular Systems, IEEE, 1996, pp. 2–8.
PCT International Patent Search, Nov. 11, 1998.

* cited by examiner

Primary Examiner—Ricky Ngo
(74) Attorney, Agent, or Firm—Jenkens & Gilchrist

(57) ABSTRACT

An improved system and method for wireless data transmission across a variety of telecommunications services operating under a variety of standards is disclosed. The system and method operate by separating the call and connection control in mobile access, providing a generic call control mechanism offering uniformity in communications and allowing a separate connection control mechanism to handle the physical and virtual channel connections.

17 Claims, 1 Drawing Sheet

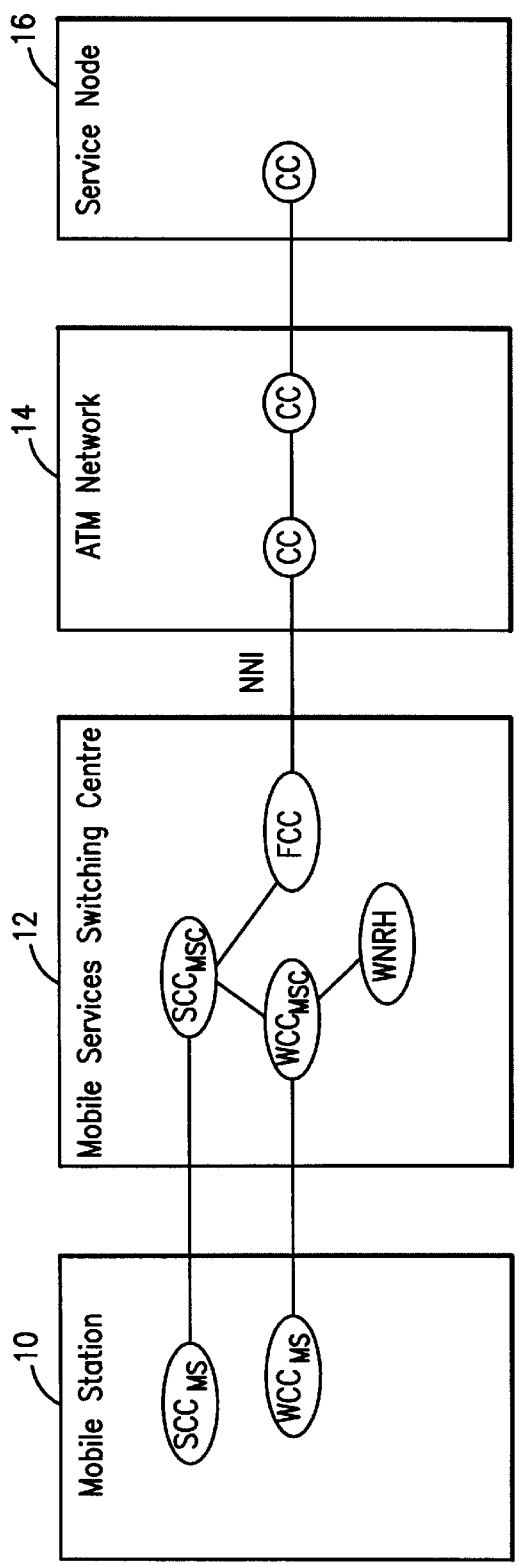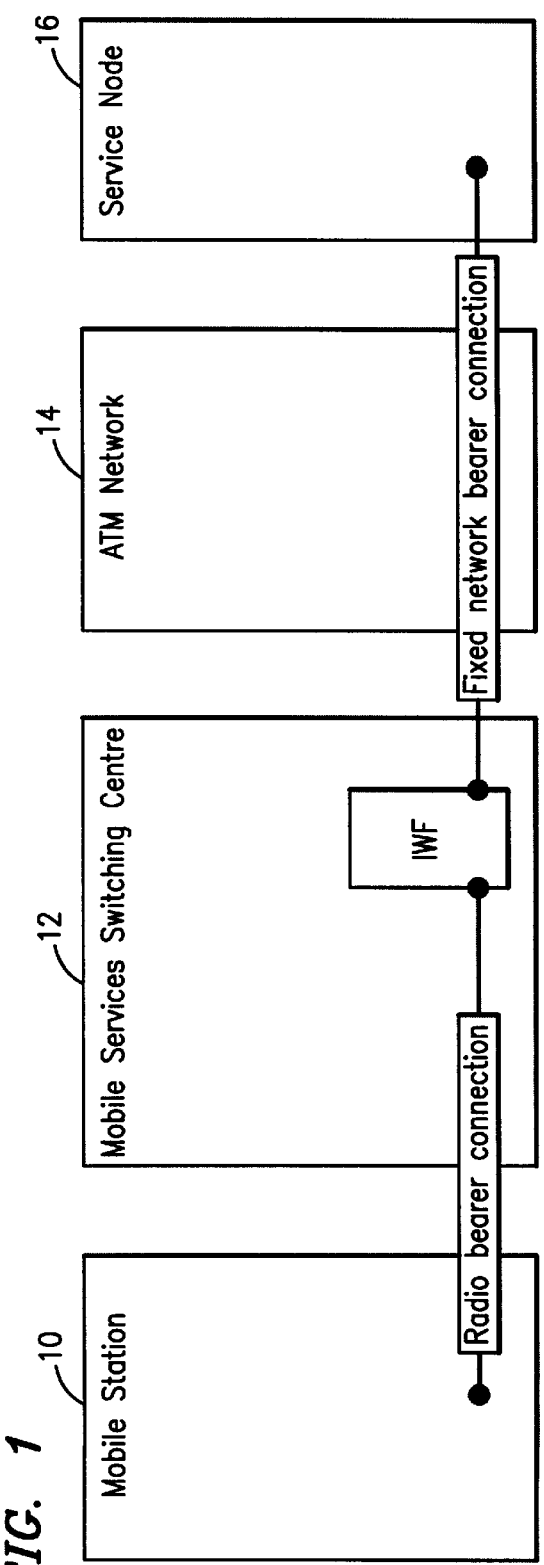

SYSTEM AND METHOD FOR MOBILE DATA SERVICES

BACKGROUND OF THE PRESENT INVENTION

1. Field of the Invention

The present invention relates generally to a system and method for communication between a mobile station and a wireline network, particularly, to an improved system and method for the transmission of data packets between a wireless subscriber and a wireline network, and, more particularly, to an improved system and method for data transmission between disparate telecommunication services utilizing a common protocol.

2. Background and Objects of the Present Invention

The evolution of wireless communication over the past century, since Guglielmo Marconi's 1897 demonstration of radio's ability to provide continuous contact with ships sailing the English Channel, has been remarkable. Since Marconi's discovery, new wireline and wireless communication methods, services and standards have been adopted by people throughout the world. This evolution has been accelerating, particularly over the last ten years, during which the mobile radio communications industry has grown by orders of magnitude, fueled by numerous technological advances that have made portable radio equipment smaller, cheaper and more reliable. The exponential growth of mobile telephony will continue to rise in the coming decades as well, as this wireless network interacts with and eventually overtakes the existing wireline networks.

Conventional wireline systems, commonly referred to as the Public Switched Telephone Network (PSTN), as well as early wireless systems, such as the Advanced Mobile Phone Services (AMPS) used in the United States, provide a fixed communications path between the message source and the destination. This fixed circuit switching technique establishes a dedicated connection or allocation of system resources, i.e., a radio channel between a base station and mobile terminal, and a dedicated phone line between the associated mobile switching center and the PSTN, for the entire duration of the call. Although such dedicated connections are useful in maintaining voice communications, which generally involve the transfer of a continuous stream of voice data which lasts for a relatively long period of time, circuit switching is not very efficient for data communications, particularly wireless data communications, because the short, bursty data transmissions are often followed by lengthy periods of inactivity, resulting in a waste of resources.

With the proliferation of computers, facsimiles, electronic mail (e-mail), short messaging and other services, the transmission of data, particularly in packet form, is becoming more prevalent. In an effort to provide a more efficient network framework for wireline data transmission, the Integrated Services Digital Network (ISDN) was developed to complement the PSTN and provide improved data services between network nodes and end-users.

In the wireless technology area, the United States cellular industry in 1993 developed the Cellular Digital Packet Data (CDPD) standard which co-exists with conventional voice-only cellular systems such as AMPS. CDPD overlays the existing cellular infrastructure and utilizes the unused air time on vacant cellular voice channels to transmit data packets therein.

Although CDPD and similar systems, such as the General Packet Radio System (GPRS) for the European Global System for Mobile Communication (GSM), attempt to optimize the scarce radio and access network transport resources, it should be understood that these systems operate independently and include their own functions and protocols for the set-up and release of packet data connections, functions and protocols absent in the underlying system.

In view of the above discussion, it is apparent that there are a number of disparate data communications systems and protocols, currently in use and proposed for use, each managing services with different characteristics, e.g., voice, circuit switched data, packet data, etc. What is needed is a uniform mechanism for handling the various types of information, particularly, in the wireless arena.

One such mechanism in the wireline area that has substantially increased the bandwidth of ISDN communications is Broadband ISDN (B-ISDN), which is based on Asynchronous Transfer Mode (ATM) technology that allows packet switching rates of up to several Gbps. ATM is a packet switching and multiplexing technique specifically designed to handle both voice users and packet data users in a single physical channel. ATM supports bidirectional transfer of data packets of fixed length between two end points, while preserving the order of transmission. More importantly, through use of B-ISDN call controls and ATM technology, disparate services having different characteristics are handled in a uniform way. As an example of the bearer service characteristics of B-ISDN, every bearer is characterized by a set of parameters such as bandwidth, delay, delay variation, cell loss ratio, etc., all of which may be found in ITU-T Recommendation Q.2931.

It is, accordingly, an object of the present invention to provide an improved system and method for the uniform handling of disparate services having different characteristics in a wireless environment.

SUMMARY OF THE INVENTION

The present invention is directed to an improved system and method for wireless data transmission across a variety of telecommunications services operating under a variety of standards. The system and method operate by separating the traditional call control into service-specific call control and radio-specific call control in mobile access, providing a generic call control mechanism offering uniformity in communications and allowing a separate connection control mechanism to handle the physical and virtual channel connections.

A more complete appreciation of the present invention and the scope thereof can be obtained from the accompanying drawings which are briefly summarized below, the following detailed description of the presently-preferred embodiments of the invention, and the appended claims.

BRIEF DESCRIPTION OF THE DRAWINGS

FIG. 1 is a schematic diagram of the component configuration of the system and method of the present invention, illustrating the control plane entities for the separation of traditional call control into service-specific call control and radio-specific call control; and FIG. 2 is a schematic diagram of the user plane bearer connectors between the components of FIG. 1.

DETAILED DESCRIPTION OF THE PRESENTLY PREFERRED EXEMPLARY EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

With reference now to FIG. 1, there is shown a block diagram illustrating the components and configuration of a system according to the present invention. As illustrated, a mobile station (MS) 10 is in radio communication with a local Mobile Services Switching Center (MSC) 12. It should be understood that MS 10 may communicate with MSC 12 via a base station (not shown), as is understood by those skilled in the art.

MSC 12, in turn, is connected to other networks via appropriate interfaces. If this network is an ATM-based B-ISDN 14 network, the interface preferably fulfills the B-ISDN NNI (Network Node Interface) specification as specified by the standardization organizations. This ATM-based B-ISDN network has a number of ATM end stations connected thereto. These ATM end stations can be, for example, gateways to other networks, and are generally referred to herein as Service Nodes 16. For instance, Service Node 16 in FIG. 1 can act as a gateway between a Transmission Control Protocol/Internet Protocol (TCP/IP) network (not shown) and the ATM network 14.

With reference now to the MS 10 in FIG. 1, the functionality within the MS 10 is divided into at least two separate and distinct control entities. The first, a Service Call Control entity in a mobile phone designated herein by the reference identifier ($SCC_{MS}$) implements a standard call control functionality such as found in B-ISDN terminals. The second, a Wireless network-specific Call Control in a mobile phone ($WCC_{MS}$), implements the requisite radio access call control functionality, e.g., service negotiation, etc., which are radio access technology dependent. In other words, the call control (CC) of the MS 10 is divided into a high-level command entity ($SCC_{MS}$), utilizing standard call control protocols and functions, and a lower-level, application-specific command entity ($WCC_{MS}$) capable of implementing the high-level command on the particular radio access technology and characteristics utilized by that MS 10, e.g., for GSM, CDPD, etc.

As in MS 10, the control within the MSC 12 pursuant to the present invention is also divided into an $SCC_{MSC}$, implementing the aforementioned standard call control functionality, e.g., B-ISDN, and a $WCC_{MSC}$, implementing the aforedescribed technology-dependent radio access call control functionality. MSC 12 also includes a Wireless Network Resource Handler (WNRH) therein for handling the particular radio resources and access network transport resources available. MSC 12 further includes a Fixed-side Call Control (FCC) for handling call control functionality towards at least one service node in a fixed or control switched network, as will be described in more detail hereinafter.

It should be understood by those skilled in the art that the respective SCC and WCC pair for each of the MS 10 and MSC 12, respectively, when operationally combined constitute the traditional mobile system call control.

As shown in FIG. 1, $SCC_{MS}$ connects to $SCC_{MSC}$ and $WCC_{MS}$ connects to $WCC_{MSC}$. However, unlike the MSC 12 where the $SCC_{MSC}$ and $WCC_{MSC}$ connect, in MS 10 there is no direct connection or relationship between the $SCC_{MS}$ and $WCC_{MS}$. It should be understood that the FCC implements the similar call control functionality as is found in the network to which the MSC connects to. If MSC 12 connects to several types of networks, e.g., to B-ISDN and N-ISDN, then the MSC 12 must be equipped with FCC functionality capable of interacting with the call control functionality in both networks, i.e., in the MSC 12 there must be an FCC for both networks.

It should also be understood that the MSC 12 also contains an InterWorking Functions (IWF) module which implements the bearer services offered by the mobile network. With reference also to FIG. 2, there is shown the aforementioned IWF within the MSC 12, providing an end-to-end bearer connection from the MS 10 to the SN 16. It should be understood, however, that the radio bearer connection between the MS 10 and the IWF in the MSC 12 is controlled by WCC protocol. Also, whereas FIG. 1 illustrates the control plane entities being used in the communication between the MS 10 and Service Node 16, FIG. 2 illustrates the user plane bearer connections therebetween. The interworking functions convert the user data from a format used over the radio interface to a format used in standard fixed networks. There are separate interworking functions for each core network. The FCC and fixed network call control entities set up and control the fixed network bearer connection. It should be understood that the end-to-end bearer connection, made up of the concatenation of the radio bearer connection and the fixed network connection, is, in turn, controlled and set up by the SCC protocol.

The operation of the system will now be described, again with reference to FIG. 1. As a preliminary matter, it should be understood that the requisite random access procedures and signaling channel allocations are first performed.

After the call from the MS 10 is initiated, the $SCC_{MS}$, forwards a conventional, high-level set-up message to the $SCC_{MSC}$ in the MSC 12. Preferably, the transmitted set-up message conforms to a known protocol, e.g., using the standard B-ISDN User-Network Interface (UNI) layer 3 specification for basic call/connection control, i.e., using ITU-T Recommendation Q.2931.

Upon reception, the $SCC_{MSC}$ examines the informational elements of the set-up message. The parameters related to the requested bearer service are then forwarded to the $WCC_{MSC}$. These radio interface connection parameters include, e.g., bandwidth related parameters, quality of service in terms of delay and delay variation, etc. It should also be understood that optional informational elements or other modifications may be made to the aforementioned standard Q.2931 message protocol to better adapt the Q.2931 protocol to the wireless environment.

Upon reception, the $WCC_{MSC}$ examines the message parameters forwarded by the $SCC_{MSC}$ and translates the message parameters to conform to the particular radio access technology characteristics used in transmission. It should, of course, be understood that the aforementioned translation process within the $WCC_{MSC}$, using the aforedescribed IWF module illustrated in FIG. 2, produces both different parameters and connections for different telecommunications systems, e.g., GSM and wideband Code Division Multiple Access (CDMA). Communication with the WNRH is determined by the aforesaid $WCC_{MSC}$ parameters, by which resources are requested from the WNRH. The location, i.e., cell and sector, of the MS 10 in question is known to the WNRH through normal mobility management transactions on a common signaling channel.

On the basis of the aforementioned parameters forwarded by the $WCC_{MSC}$, the WNRH determines whether or not a new user data connection to the particular cell (of the MS 10) is possible and forwards an acceptance or rejection signal to the $WCC_{MSC}$. If the data connection can be made and the communication is accepted, the $WCC_{MSC}$ requests the WNRH to reserve the resources necessary for the connection. It should be understood that the WNRH may then allocate the requisite resources itself.

Upon connection acceptance, the $WCC_{MSC}$ sends a set-up message to the $WCC_{MS}$, including the requisite radio access technology dependent parameters in order to set up the requested bearer(s). The set-up request can be rejected to the $WCC_{MS}$, e.g., on the basis of lacking resources in the mobile station (i.e., the MS 10 cannot handle the requested bearer). If the connection is acceptable, however, the $WCC_{MS}$ sends an acknowledgment signal to the $WCC_{MSC}$. Upon receipt of the aforesaid acknowledgment signal, the $WCC_{MSC}$ forwards an acknowledgment signal to the $SCC_{MSC}$ in MSC 12.

It should be understood that the $SCC_{MSC}$, while initially contacting the $WCC_{MSC}$ and forwarding the aforedescribed service parameters, may also forward a message to the FCC. It should also be understood that the parameters in the FCC message from the $SCC_{MSC}$ are preferably a subset of those of the original set-up request from the $SCC_{MS}$ where the requested connection is to an ATM network, such as the one illustrated in FIG. 1 with the reference numeral 14. It should also be understood, however, that the parameters in the $SCC_{MS}$–$SCC_{MSC}$ message exchange describe end-to-end service, and in an ATM network the parameters are preferably the same. In the case of an N-ISDN network, however, a parameter translation must be done.

The FCC, upon receipt of the aforedescribed FCC message parameters, then forwards a message to the aforementioned ATM network 14 for a connection to the call control functionality in particular Service Node 16 indicated by the $SCC_{MS}$ in the original set-up request. The FCC further reserves resources for the connection between the MSC 12 and the ATM network 14, i.e., the exchange terminal, the interface between which, as discussed, is Network Node Interface-type.

After the FCC receives a message from the ATM network 14 that the resources to the particular Service Node 16 are reserved, the FCC forwards a message to the $SCC_{MSC}$ to that effect, and the $SCC_{MSC}$, in turn, notifies the $SCC_{MS}$ that the other end of the connection is ringing. When the FCC receives a connect message from the ATM network 14, the $SCC_{MSC}$ forwards a connect message to the $SCC_{MS}$. The $SCC_{MS}$, upon receipt of the connect message, sends an acknowledgment message back to the $SCC_{MSC}$, which makes a through connection from the MS 10 to the particular Service Node 16 in the mobile network. It should be understood that the aforesaid through connection includes the connection of the IWF to the MS 10 via various devices. The $SCC_{MSC}$ then orders the FCC to send a connect-acknowledgment message to the ATM network 14 which finalizes the through connection to the particular Service Node 16.

In the aforedescribed manner a virtual channel is created, linking the mobile subscriber to a wireline or wireless user. The procedures to set-up calls and the connections are the same and independent of the particular service used, i.e., the same call control functional entities and signaling protocols are used, providing uniformity in the use of radio and access network transport resources. As discussed, the system and method of the present invention preferably provides a B-ISDN-like mechanism for mobile access. For example, in the case of a packet data connection to a Transmission Control Protocol/Internet Protocol (TCP/IP) network, the Public Land Mobile Network (PLMN) call control in question, e.g., GSM, AMPS, etc., is in charge of setting up the virtual connection between the MS 10 and the ATM network 14 connected to the TCP/IP network, as in B-ISDN. Setting up this virtual channel, however, does not reserve transport resources inside the PLMN permanently. Instead, the resources are reserved and used only when needed, thereby optimizing scarce resources. It should be understood that actual bearer control inside the PLMN is the responsibility of the WCC function.

The introduction of B-ISDN-like call control procedures and the separation of call and connection control in the mobile access permits the integration of call control procedures of all services, including packet data services, creating a generic call control mechanism and uniform call control message exchange over the air interface for all services. The connection control is handled separately inside the PLMN through virtual connections.

Although one embodiment of the present invention, directed to the creation of a virtual connection to a gateway between an ATM-based PLMN and the Internet is described, e.g., in connection with the use of IETF RFC 1755 (ATM signaling support for Internet Protocol over ATM) for transferring Internet Protocol (IP) datagrams between the MS 10 and an Internet gateway, other embodiments should be considered within the scope of the present invention also. For example, the network to which the MSC 12 (or the PLMN) connects may not be an ATM-based B-ISDN network and instead may be an NISDN network or other like network.

The previous description is of a preferred embodiment for implementing the invention, and the scope of the invention should not necessarily be limited by this description. The scope of the present invention is instead defined by the following claims.

What is claimed is:

1. A telecommunications system for connecting a mobile subscriber terminal to a service node, said system comprising:
   a Mobile Services Center in radio communication with said mobile subscriber terminal and in wireline communication with said service node;
   radio call control means within both said Mobile Services Center and said mobile subscriber terminal, said radio call control means coordinating said radio communication therebetween; and
   service call control means within both said Mobile Services Center and said mobile subscriber terminal, said service call control means coordinating said wireline communication with said service node, said service call control means within said Mobile Services Center being connected to said radio call control means therein, and said service call control means within said mobile subscriber terminal being disconnected from said radio call control means.

2. The telecommunications system according to claim 1, further comprising:
   wireless network resource handling means, within said Mobile Services Center, for coordinating resources used by said radio call control means and said service call control means.

3. The telecommunications system according to claim 2, wherein said wireless network resource handling means allocates said resources if said radio and wireline communications are accepted.

4. The telecommunications system according to claim 2, wherein said wireless network resource handling means rejects allocation of said resources if said radio or wireline communications are rejected.

5. The telecommunications system according to claim 1, further comprising:
   a fixed-side call control means, within said Mobile Services Center and connected to said service call control means therein, for coordinating said wireline communication with said service node.

6. The telecommunications system according to claim 5, wherein said fixed-side call control means coordinates said wireline communication pursuant to a given one of a multiplicity of telecommunications networks attached thereto.

7. The telecommunications system according to claim 1, further comprising:
   interworking function means, within said Mobile Services Center, for converting a radio communication from said Mobile subscriber terminal to a given wireline communication mode.

8. The telecommunications system according to claim 7, wherein said interworking function means coordinates said conversion pursuant to a given one of a multiplicity of wireline communication modes.

9. The telecommunications system according to claim 1, further comprising:
   an asynchronous transfer mode means for connecting said Mobile Services Center to said service mode.

10. The telecommunications system according to claim 9, wherein said asynchronous transfer mode means is a Broadband Integrated Services Digital Network.

11. The telecommunications system according to claim 1, wherein said service node is a gateway to another telecommunications system.

12. The telecommunications system according to claim 11, wherein said service node is a gateway between a Transmission Control Protocol/Internet Protocol network.

13. In a telecommunications system having a mobile subserver terminal in communication with a Mobile Services Center (MSC), said Mobile Services Center being in wireline communication with a service node, a method for connecting said mobile subscriber terminal (MT) to said service node, said method comprising the steps of:
   receiving, within an MSC service call controller within said mobile subscriber terminal, a call setup request from an MT service call controller within said mobile subscriber terminal to said service node, said call setup request containing therein interface connection parameters;
   forwarding, from said MSC service call controller, said interface connection parameters of said call setup request to an MSC wireless call controller within said Mobile Services Center;
   establishing a resources link between said mobile subscriber terminal and said service node; and
   upon establishment of said resources link, forwarding, from said MSC wireless call controller to an MT wireless call controller within said mobile subscriber terminal, a call setup request reply to said call setup request, thereby establishing a communication link between said mobile subscriber terminal and said service node.

14. The method according to claim 13, wherein, in said step at receiving, said call setup request is a high-level message pursuant to an ISDN protocol.

15. The method according to claim 13, wherein, in said step of establishing the resources link, a resource handler connected to said MSC wireless call controller establishes said resources link.

16. The method according to claim 15, wherein the resource handler converts said interface connection parameters to a plurality of radio access parameters associated with said resources link.

17. The method according to claim 13, wherein, after said step of receiving the call setup request, the MSC service call controller forwards a plurality of service parameters to a fixed-side call controller, said fixed-side call controller establishing said resources link.

* * * * *